United States Patent [19]
Takeichi et al.

[11] Patent Number: 5,199,632
[45] Date of Patent: Apr. 6, 1993

[54] RAILWAY CAR BODY STRUCTURES AND METHODS OF MAKING THEM

[75] Inventors: Michifumi Takeichi; Sumio Okuno; Masato Okazaki; Morishige Hattori, all of Kudamatsu, Japan

[73] Assignee: Hitachi, Ltd., Tokyo, Japan

[21] Appl. No.: 915,622

[22] Filed: Jul. 21, 1992

Related U.S. Application Data

[62] Division of Ser. No. 544,696, Jun. 27, 1990, Pat. No. 5,140,913.

[30] Foreign Application Priority Data

Jun. 30, 1989 [JP] Japan ................. 1-166691
Dec. 27, 1989 [JP] Japan ................. 1-339253

[51] Int. Cl.⁵ ............................ B61D 17/00
[52] U.S. Cl. ..................... 228/181; 228/184; 228/187; 29/455.1
[58] Field of Search ............ 228/181, 184, 187; 29/455.1

[56] References Cited

U.S. PATENT DOCUMENTS

| | | | |
|---|---|---|---|
| 3,071,853 | 1/1963 | Price et al. | 29/455.1 |
| 3,110,961 | 11/1963 | Melill et al. | 228/181 |
| 3,282,615 | 11/1966 | Darby et al. | 29/455.1 |
| 4,013,210 | 3/1977 | Deminet | 228/181 |
| 4,966,082 | 10/1990 | Takeichi et al. | 105/422 |
| 4,993,329 | 2/1991 | Takeichi et al. | 105/401 |
| 5,098,007 | 3/1992 | Tsuruda et al. | 228/125 |

*Primary Examiner*—Kenneth J. Ramsey
*Attorney, Agent, or Firm*—Antonelli, Terry, Stout & Kraus

[57] ABSTRACT

A method is provided for making a passenger car body structure which has a panel assembly forming at least part of a side, the roof, and end of the floorplate. Each panel has inner and outer spaced metal sheets and a cellular metal core brazed to the sheets and maintaining them spaced apart. To join the panels, a metal connecting member is joined to at least one of the inner and outer sheets and has a projection for use in welding the panel to the neighboring panel. The projection extends in the lateral direction of the panel and is preferably of material thicker than the general sheet thickness of the sheets. A frame member of the body structure may be welded to the panels at the joint.

7 Claims, 8 Drawing Sheets

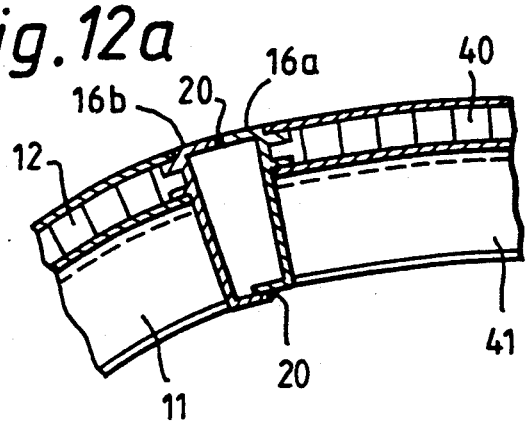
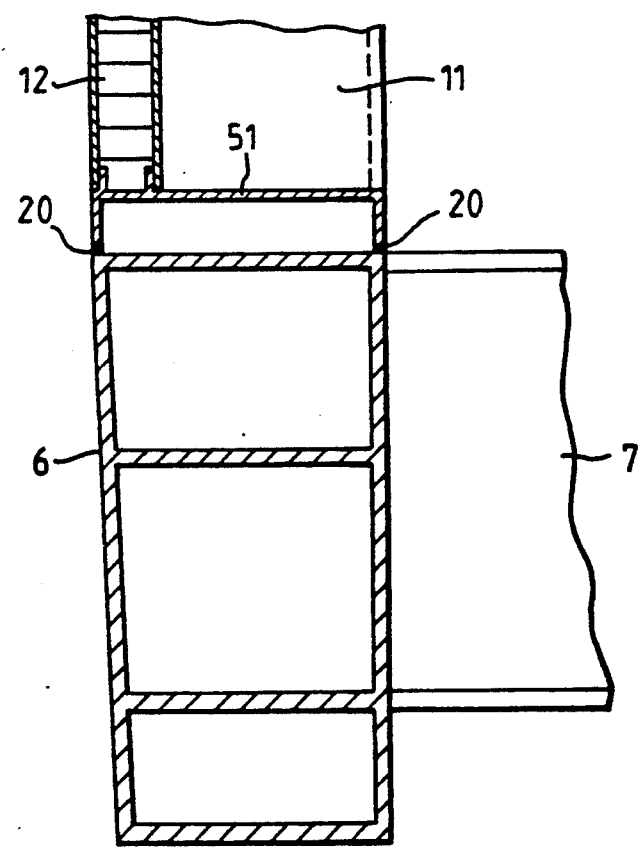

RAILWAY CAR BODY STRUCTURES AND METHODS OF MAKING THEM

This is a divisional of application Ser. No. 544,696, filed Jun. 27, 1990, now U.S. Pat. No. 5,140,913.

BACKGROUND OF THE INVENTION

1. Field of the Invention

This invention relates to railway car body and methods of making the same and is applicable to the manufacture of railway and other track-guided vehicle bodies, including bodies for monorail and mag-lev (magnetic levitation) vehicles, as well as to railway powered cars, non-powered cars and locomotives, particularly to passenger cars for railway vehicles operating at high speed.

2. Description of the Prior Art

Conventionally, railway car body structures have been formed of steel by, for example, connecting longitudinal frame members and transverse frame members and then connecting outside sheets to the outside of the frame. In such a structure produced using stainless steel as the outside sheets, for example, 3-dimensional joints are employed in order to improve strength between the frame members and the outside sheets as disclosed in JP-B-62-35937. It is also known to produce a railway car body structure using light metal, such as aluminum alloy. The aim is to reduce the number of man-hours in production of the car body structure and to improve stiffness of the car body structure, using pre-shaped members in which frame members and the outside sheet are integral. For example, body structures with extruded shaped members are described on pages 70 to 72 of "Light Metal Railway Vehicle Committee Report 0036 No. 3", published in 1978 by the Japanese Railway Vehicle Industry Association, pages 70-72.

Another type of pre-formed metal member is a sandwich construction having two metal sheets that are spaced apart and are bonded to opposite faces of a cellular metal core by an adhesive or by brazing. The core may be a formed metal or a honeycomb construction, which is itself, for example, produced by brazing together of corrugated sheet. Such sandwich constructions have been proposed for use in railway car bodies, but for the most part not as structural members of such car body structures i.e. members contributing substantially to the structural strength of the car body.

In Japanese utility model publication no. 60-179569, honeycomb sandwich panels are provided as stiffeners of the outside plates of the car body, by adhesively bonding the honeycomb panel to the interior face of the outside plate. Here, the honeycomb panels are acting as reinforcements against bending of the outside plate.

In Japanese utility model publication no. 54-183007, honeycomb panels are proposed as floorboards, which rest upon the floorplate constituting the underframe of the vehicle body however, the honeycomb panel does not act as a structural member, and is connected to the floorplate by adhesive bonding.

Japanese utility model publication no. 63-18372 however proposes the use of a honeycomb panel as a structural member in the floorplate of a railway car body, with the panel connecting extruded members which constitute the side sills of the car body. The honeycomb panels are connected by rivetting to the extruded members. At the present time, rivetting is an unsuitable connection method for structural members of railway car bodies, at least at visible regions, and also cannot provide a hermetic joint between structural members.

A further disadvantage of rivetting resides in the amount of labor required, which is greater than that for welding.

The prior art discussed above therefore does not provide solutions to the problem of reduction in weight of railway car body structures. With the increase in running speeds of railway vehicles, problems such as increase of impact on the rails and increase of noise, as well as increase of power consumption can be mitigated by reduction of the weight of the railway car body structure. Weight reduction is attempted by reducing the thickness of the frame members and of the outside sheet members, but the amount of reduction is limited by the need to maintain stiffness of the body structure.

In the case of pre-shaped members made of light alloys by extrusion, there is a technical limit to the reduction of the thickness of the shaped member, and furthermore if thickness is reduced too much, out-of-plane bending stiffness and shearing stiffness is reduced, so that there is a need for a large number of reinforcing members thereby also increasing the labor required in manufacturing of the vehicle.

A further problem with high speed railway vehicles is that inside a tunnel there may be drastic outside pressure changes, which may occur rapidly, particularly when vehicles pass each other inside the tunnel. To prevent such a pressure change from being transmitted to the interior of the vehicle which is unpleasant for the passengers, the body structure can have a generally hermetic structure. However, the body structure must then resist not only the load of the passengers and the various equipment attached to it and its own weight, but also the pressure load due to the exterior pressure changes. Thus, an increase in stiffness of the body structure is required and an improvement in strength against the pressure load must be achieved.

SUMMARY OF THE INVENTION

It is an object of the present invention to overcome or reduce these problems, and, in particular, to make it possible to satisfactorily to apply the sandwich type metal members described above to the construction of railway vehicle car body structures.

In one aspect, the present invention provides a structural panel for a railway car body structure, for forming at least part of a side, the roof, an end or the floorplate of the body structure. The panel comprises inner and outer spaced metal sheets and a cellular metal core bonded to the inner and outer sheets and maintaining the inner and outer sheets spaced apart. At at least one edge of the panel, a metal connecting member is joined to at least one of the inner and outer sheets by continuous metal-to-metal bonding and has a projection for use in welding the panel to an adjoining panel. This projection extends in the lateral direction of the panel and is of material thicker than the general sheet thickness of the inner and outer sheets.

The lateral direction of the panel herein referred to is the direction parallel to the inner and outer sheets at the relevant location, bearing in mind that the sheets may be either curved or planar. The lateral direction at the edge of the panel is thus the direction of the sheets at the edge portion, and is at right angles to the direction perpendicular to the sheets. The general sheet thickness here referred to is the nominal sheet thickness, i.e. ignoring any integral ribs or other thickenings provided for particular purposes.

The use of the connecting member with its welding projection makes possible the convenient assembly of the laminate panels into panel assemblies of suitable strength for the railway car body. Strength is obtained by using a continuous metal-to-metal joint, i.e. a joint employing metal rather than non-metal such as adhesive and joining the parts along a line, not at spots.

Preferably the inner and outer sheets, the core and the connecting member of the panel are bonded together by brazing.

Brazing, i.e. application of an alloy of lower melting point than the metal parts to be joined and heating to create the bond, is the preferred method of creating the desired continuous metal-to-metal bond. Another method is welding continuously.

Preferably, the core has a honeycomb structure having parallel cells whose axial direction is perpendicular to said inner and outer sheets. To achieve a satisfactory outer surface of the car body, the welding projection of the connecting member may have an outer surface which is flush with the outer surface of the outer sheet of the panel. The connecting member is preferably joined to both of the inner and outer sheets by continuous metal-to-metal bonding.

In another aspect, the invention provides a railway car body structure including a panel assembly comprising at least two adjacent structural panels joined edge-to-edge to each other at a mutual joint and forming at least a part of one of the sides, roof, ends and floorplate. In the panel assembly each panel has inner and outer metal sheets, and a cellular metal core bonded to said inner and outer sheets and maintaining the said sheets spaced apart. At least one of the joined panels includes at their joint a connecting member joined to an edge portion of at least one of the inner and outer sheets of the panel by continuous metal-to-metal bonding and having a projection welded to the adjacent panel.

In yet another aspect, the invention provides a method of making a railway car body structure having two opposite sides, a roof, two ends and a floorplate. The method includes forming a structural panel assembly which is at least part of one of said sides, roof, ends and floorplate by aligning at least two panels in an edge-to-edge relationship, with each of the panels comprising inner and outer metal sheets and a cellular metal core bonding the sheets and maintaining the sheets in a spaced apart position, with at least one panel having, at an edge thereof, a connecting member joined to at least one of the sheets by a continuous metal-to-metal bonding and including a welding projection. The welding projection is welded to the other panels so as to join the panels together into a panel assembly.

BRIEF INTRODUCTION OF THE DRAWINGS

Embodiments of the present invention will now be described by way of non-limitative example with reference to the accompanying drawings in which.

Figure 10:
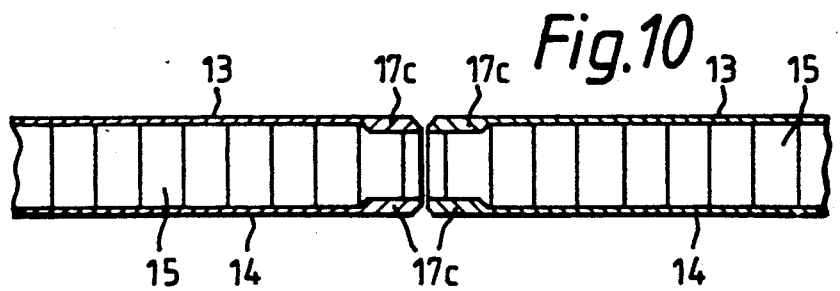
Figure 11:
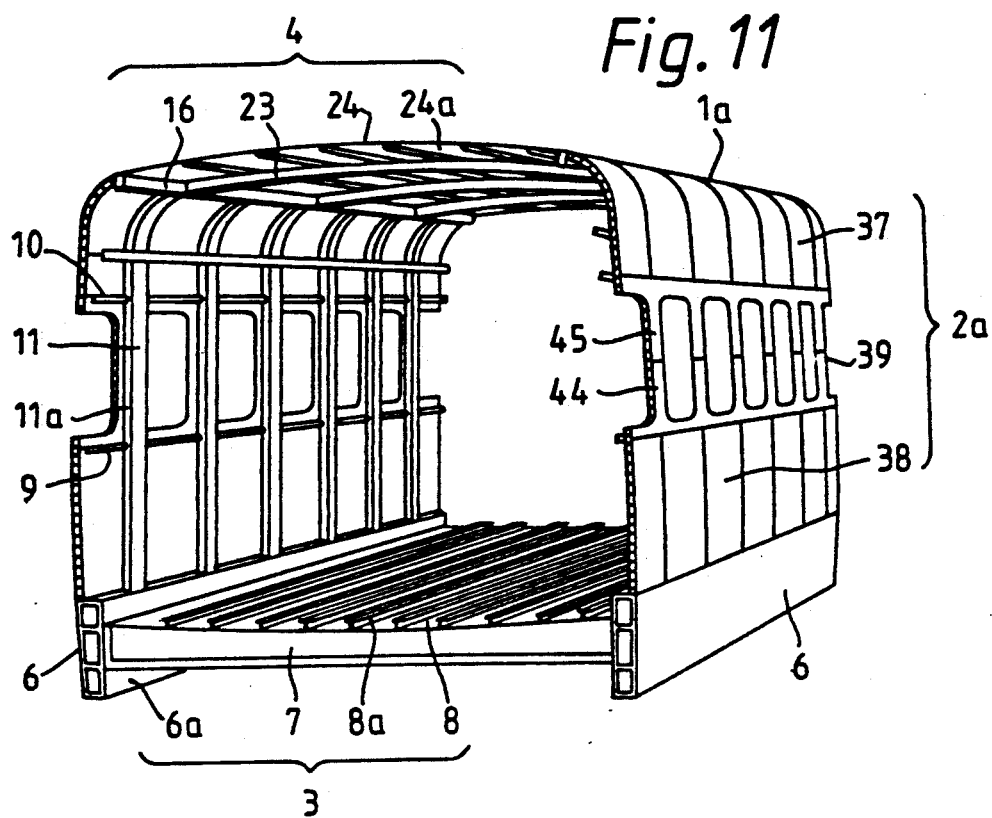
Figure 12:
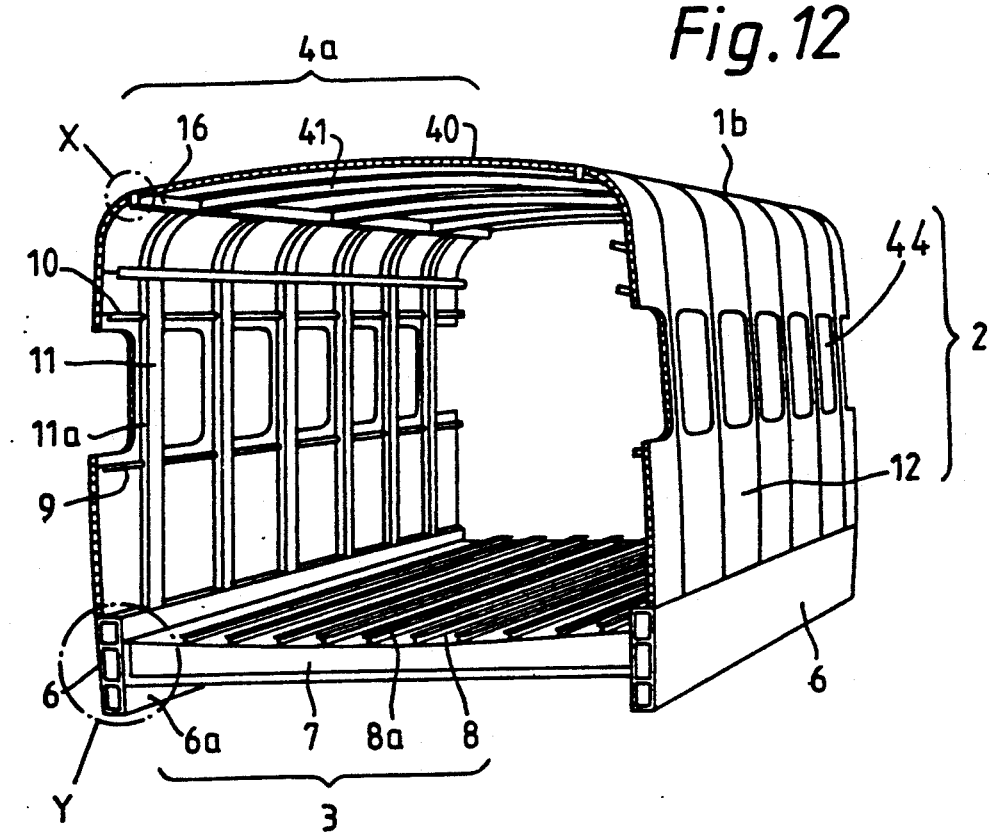
Figure 16:
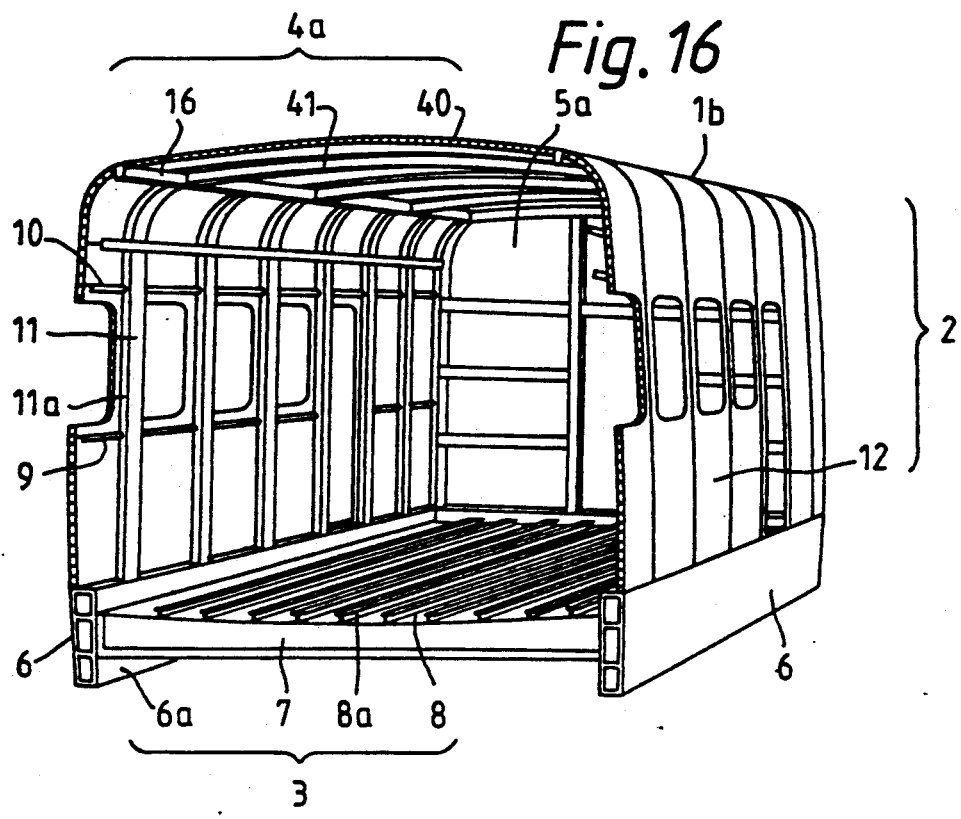
Figure 17:
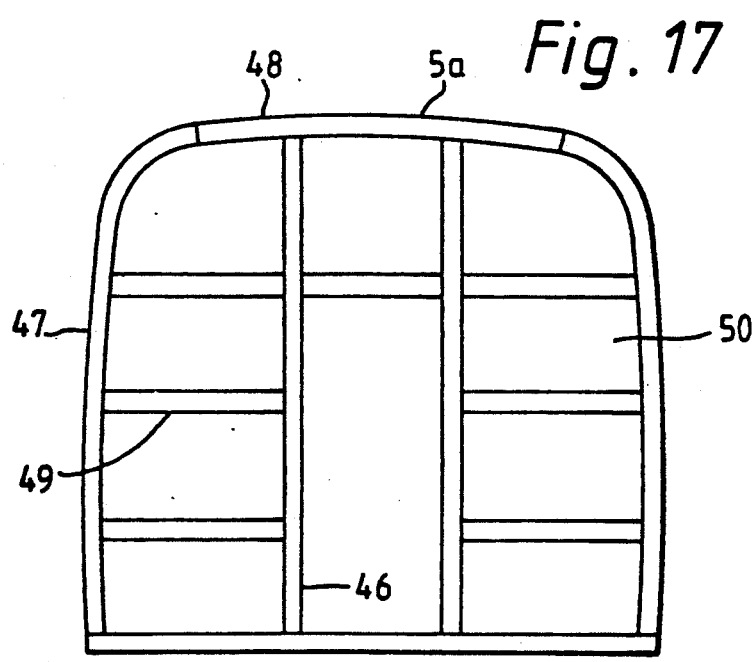
Figure 18:
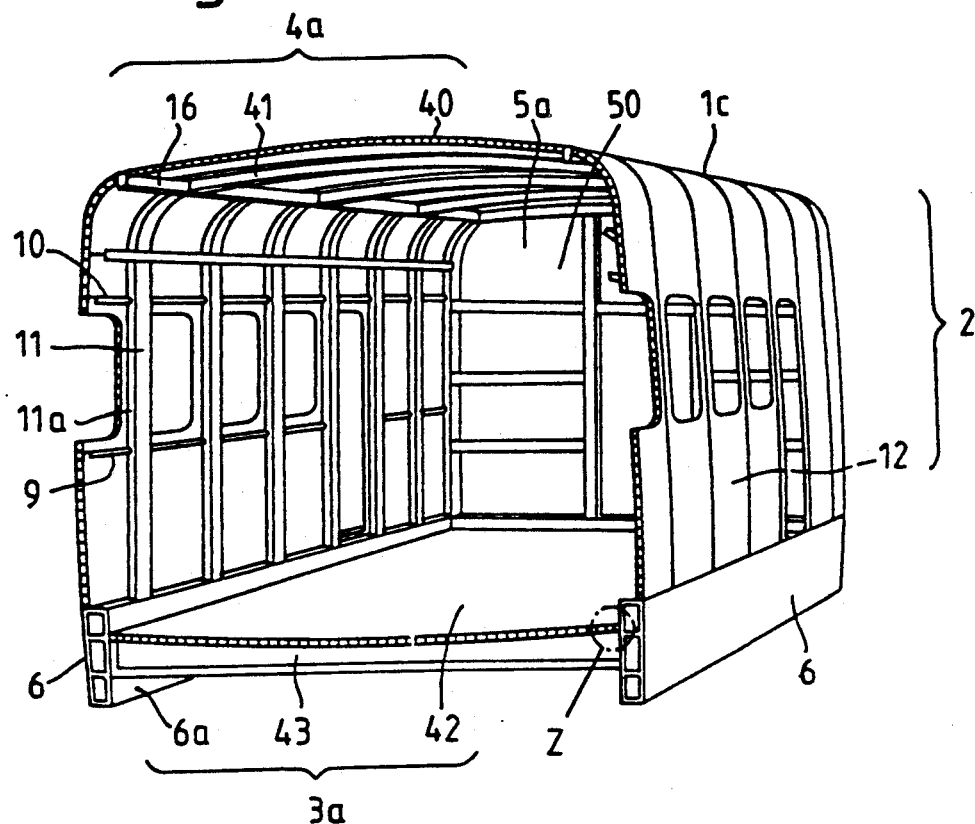
Figure 18A:
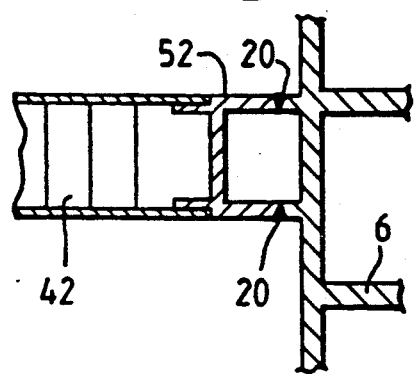
Figure 13:
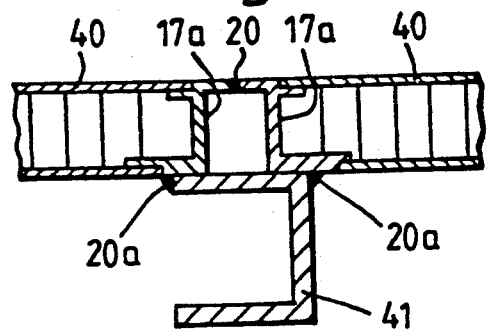
Figure 14:
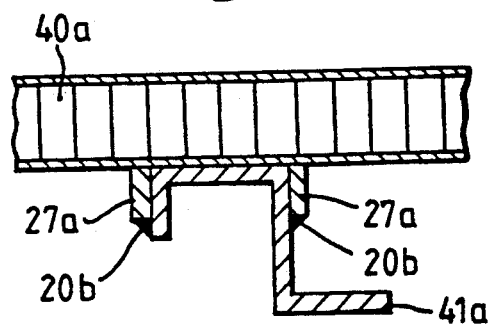
Figure 15:
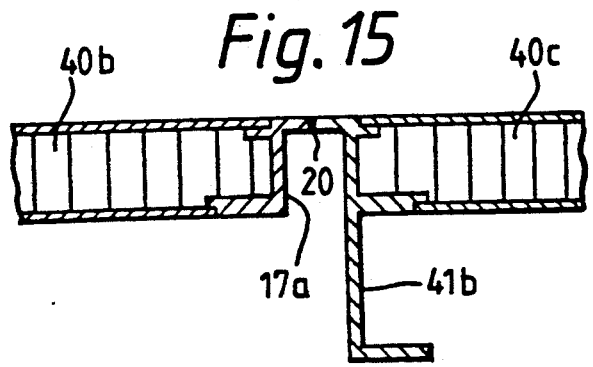

FIG. 10 showed in cross section a further pair of laminate members which may be used in the present invention, aligned for joining;

FIGS. 11 and 12 are sectional perspective views of two further embodiments of the railway car body structure of the present invention;

FIG. 12a is an enlarged cross sectional detail view in the portion X in FIG. 12;

FIG. 12b is an enlarged cross sectional view of the portion Y of FIG. 12 showing further detail;

FIG. 13 is another sectional view of the joint between two laminate members which can be used in the present invention, together with a frame member;

FIG. 14 is a cross-sectional view of a laminate member which can be used in the present invention, joined to a frame member;

FIG. 15 is a cross-sectional view of two laminate members which can be used in the present invention, including an integral frame member;

FIG. 16 is a sectional perspective view of another railway car body structure according to the present invention;

FIG. 17 is a view, from inside the car body, of the end of the body structure of FIG. 16;

FIG. 18 is a sectional perspective view of yet another railway car body structure embodying the invention, and FIG. 18a is an enlarged cross-sectional detail view of the portion Z of FIG. 18.

DESCRIPTION OF THE PREFERRED EMBODIMENTS

Referring now to the drawings wherein like reference numerals are used throughout the various views to designate like parts and, more particularly, to FIGS. 1-4, according to these figures, a railway car body structure 1 includes of opposite side constructions 2, an underframe 3, a roof construction 4 and end constructions 5. Side sills 6 of the underframe 3 are disposed at the bottom of the side constructions 2 and extend in the longitudinal direction of the car body. Cross beams 7 extend between the side sills 6 in the transverse direction of the car body. The ends of the cross beams 7 are coupled to the side surface 6a of the side sills 6. The cross beams 7 are disposed in parallel with one another with a predetermined pitch in the longitudinal direction of the car body. A floor plate 8 is disposed on the cross beams 7, and includes a plurality of shaped members of a light alloy extending in the longitudinal direction of the car body, with ribs integrally formed on their upper side. In the transverse direction of the car body, the floorplate 8 is shaped as a curved surface which is convex outwardly of the car body, that is, convex downward.

In the side construction 2, there is a belt rail 9 and a window head 10, both being frame members. Vertical frame members in the form of side posts 11 are located between the windows. Side panels 12 including of a later described laminate material are connected to the outer surface of these frame members. The belt rail 9 and window head 10 are disposed so as to correspond to the upper side and lower side positions of the window openings in the side panels 12. The belt rail 9 and window head 10 are bonded to the side surface 11a of the side posts 11 so as to cross the side posts 11 at right angles.

Figure 3:
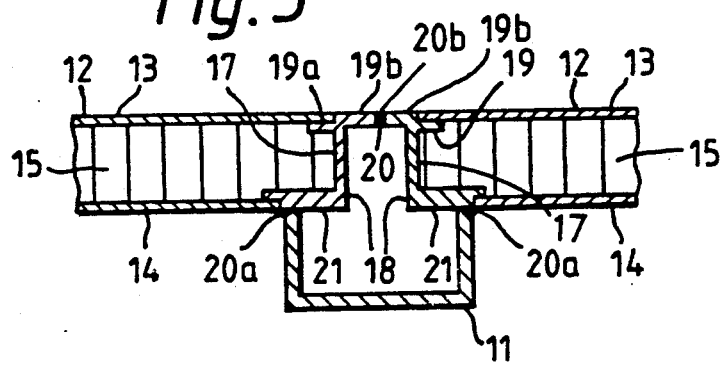
FIG. 3 is a cross sectional view taken along the line A—A in FIG. 2.

The side panel 12 has a laminate structure including of metal inner and outer sheets 13 and 14 and a cellular metal core 15 disposed between the sheets 13 and 14 as shown in FIG. 3. The outer sheet 13 constitutes the outer surface of the car body structure 1. A honeycomb material made of a light alloy, for example, is used as the core material 15. Formed metal made of a light alloy or thin metal sheet shaped in a grid form may be used in place of the honeycomb material. The honeycomb core 15 is made by brazing thin corrugated sheets and the surface sheets 13, 14 and the core 15 are also connected by brazing. When pressure outside the body structure 1 changes, the side panels 12 can provide a hermetic wall which keeps the interior pressure constant.

The principles of construction of these structural panels are already known, and detailed description is not necessary. The preferred materials are aluminum and aluminum alloy.

The honeycomb core 15 made of brazed sheets providing hexagonal cells whose axes extend perpendicular to the sheets 13, 14 is preferred, but rectangular or square cells may be used. Alternatively sinusoidal sheets may be joined to produce a cellular core structure. Instead of aluminum or aluminum alloy, stainless steel may be employed, especially for the sheet 13 which provides the outer face of the panel.

Such panels when adapted as described here are highly suitable for railway car bodies, because of their light weight and high rigidity. The cellular core attached to the surface sheets has only small surface strains. High-temperature resistance is good, so that welding connections can be made, as described below.

In the typical hexagonal honeycomb type panels used in the invention, the core cell size is in the range of $\frac{1}{8}$ to 1 inch (0.3 to 2.5 cm). The core is made of brazed together corrugated sheet of thickness in the range 0.2 to 0.5 mm. The surface sheets have a thickness in the range of 0.8 to 1.2 mm, and the overall panel thickness is in the range 10 to 40 mm. Such a panel of aluminum can have typically, for an overall thickness of 26.6 mm, a weight of 0.73 g/cm$^2$. Aluminum or steel plate of comparable weight has much lower strength, and requires reinforcement.

Each panel 12 extends from the upper surface of the side sill 6 of the underframe 3 to a cant rail 16 described below. The dimension of width of each panel 12 in the longitudinal direction of the car body corresponds to a unit length when the side construction 2 is divided into a plurality of units in the longitudinal direction of the car body. The outer surface of the side construction 2 is formed by connecting a plurality of the panels 12 by welding. In the side construction 2, an example where the region between each pair of side posts 11 is constituted by one panel 12 is illustrated. However the width of each panel 12 may extend over three or more side posts 11.

Next, the joints between the panels 12, the side post 11 and the belt rail 9 will be explained with reference to FIGS. 3 and 4.

FIG. 3 shows a metal connecting member 17 which is brazed continuously to the edge of the panel 12 at the time of its formation and which is an extruded member made of a light alloy. This connecting member 17 is shaped in a substantially Z-shaped section and has a cross web 18 to which the core 15 reaches and a flange portion 19a provided with a step corresponding to the sheet thickness of the outer sheet 13. A projecting flange 19b which is to be connected to the connecting member 17 of the adjacent panel 12 by welding is formed on the connecting member 17 on the opposite side to the flange portion 19a described above so as to project laterally from the panel 12. The outer surface of the flange 19b is at the same level as the outer sheet 13, i.e. flush therewith. The flange 19b is thicker than the sheets 13, 14. A weld 20 connects the flanges 19b of the adjacent connecting members 17.

The flange portion 21 of the connecting member 17 at the inner side has a step for connecting to the inner sheet 14 and is also of relatively large thickness. A weld 20a connects this flange 21 to the side post 11. In other words, the side post 11 is connected so as to bridge between the connecting members 17 of the adjacent side panels 12.

In the manufacture of the car bodies, the adjacent panels 12 are first connected by welding at the respective flanges 19b. When the mutual connection of the panels 12 is complete in this manner, the side post 11 is connected to each connecting member 17 as described already.

The surface 20b of the weld portion 20 on the outside of the car is smoothed by grinding or the like after the completion of the welding.

In all the embodiments described, the connecting members, such as member 17, are attached to the sheets 13, 14 of the panels at as many edges as necessary. Various different shapes and arrangements are possible, depending on the location in the car body, as will be apparent. Generally, the connecting members illustrated have one or more welding flanges projecting as extensions of one or both of the sheets 13, 14 and thicker than the sheets 13, 14.

Figure 4:
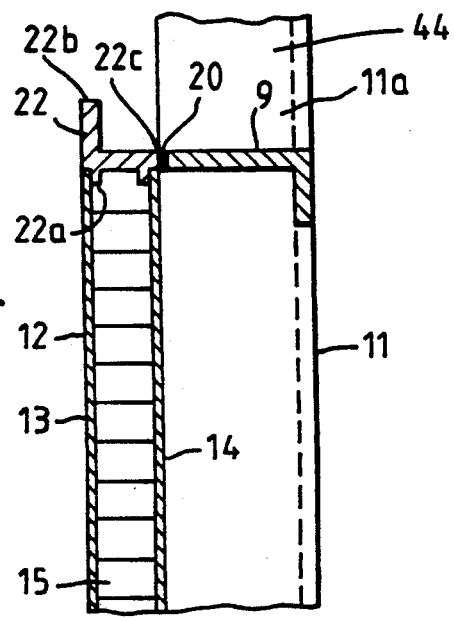
FIG. 4 is a cross sectional view taken along the line B—B in FIG. 2.

FIG. 4 shows that the belt rail 9 has a sectional shape which is substantially L-shaped. An edge member 22 is disposed around the window opening portion 44 of the panel 12 shown in FIG. 1, that is, around the edge 44a and is brazed continuously to the panel 12. The edge member 22 reinforces the edge 44a of the window opening portion and receives the window glass. A flange portion 22a acts as a chill strip of the surface members 13, 14 and a flange portion 22b as the window glass receiver are formed on this edge member 22. The belt rail 9 is connected by welding at 20 to the end surface 22c of the edge member 22 on its inner side. The belt rail 9 is divided at the position of the side post 11 so that its end portion in the longitudinal direction is bonded to the side surface 11a of the side post 11. Connecting of the belt rail 9 to the edge member 22 may be completed before, or after, the panels 12 are joined mutually.

The window head 10 is constituted in substantially the same way as the belt rail 9 and is bonded to the end surface 22c of the edge member 22 on the indoor side. The window head 10 is divided at the position of the side post 11 and its end portions in the longitudinal direction of the car body are connected to the side surface 11a of the side post 11.

Figure 1:
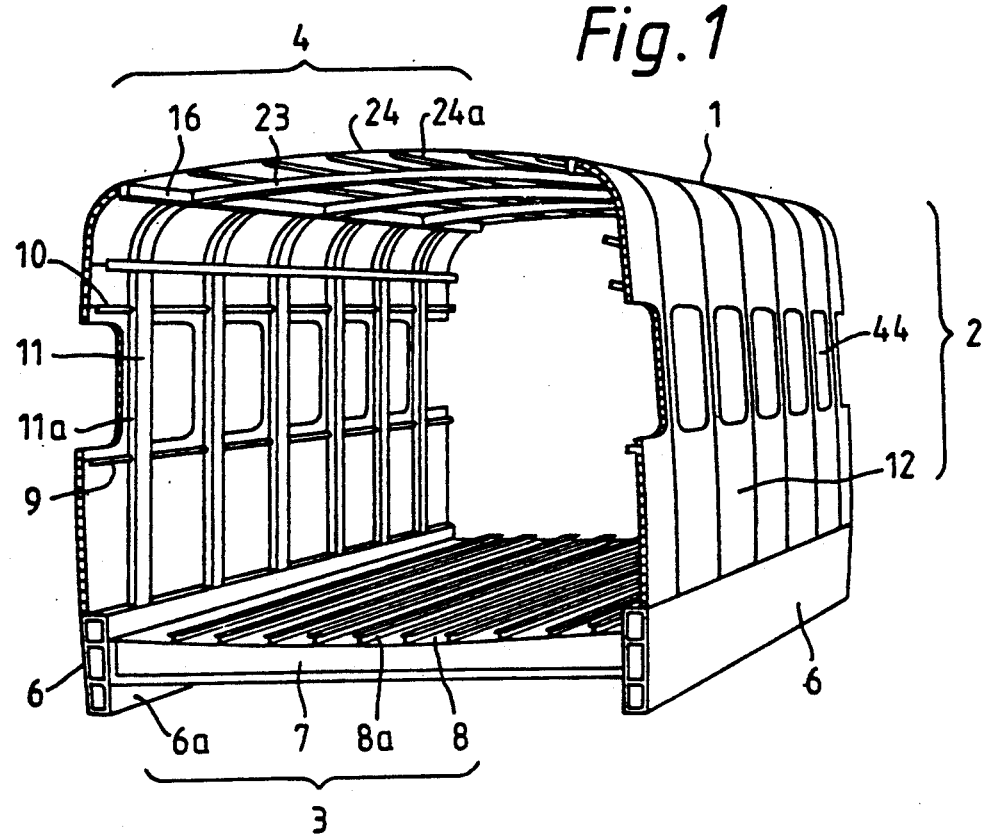
FIG. 1 is a sectional perspective view showing a first embodiment of a railway car body structure in accordance with the present invention.
Figure 2:
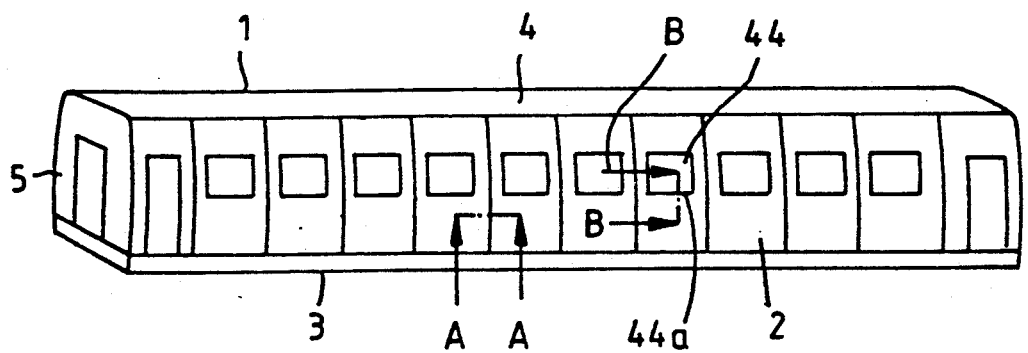
FIG. 2 is a schematic perspective view of the an entire railway car body structure shown in FIG. 1.

Next, the roof construction 4 will be explained with reference to FIG. 1. Cant rails 16 extend in the longitudinal direction of the car body, and carlines or rafters 23 are connected to the cant rails 16 at right angles. The roof construction 4 is constructed by the cant rails 16, the carlines 23 and roof sheets 24. The cant rails 16 are disposed at both sides of the roof in the circumferential direction of the car body and the carlines 23 extend between these cant rails 16 and parallel with one another with a predetermined pitch. Both ends of the carlines 23 are connected to the cant rails 16. The roof sheets 24 are connected to the upper surface of these cant rails 16 and carlines 23. The roof sheets 24 are constituted by aligning shaped members of a light alloy to extend in the longitudinal direction of the car body and adjacent to one another in the transverse direction of the car body, and connecting them together. The roof sheets 24 have ribs 24a formed integrally and in the longitudinal direction of the car body on their inside.

The end construction 5 at each end of the car body structure 1 is constructed as described below by connecting vertical frame members and horizontal frame members and placing panels on the outer surface of these frame members.

In the end construction 15, the major proportion of the acting load is a pressure load due to a pressure change outside the car body. For this reason, strength need not be improved in comparison with the side construction 2 on which the vertical load and the pressure load with the pressure change outside the car body act simultaneously. The body structure 1 is completed by individually producing the side constructions 2, the underframe 3, the roof construction 4 and the end constructions 5 and connecting them together. The panel 12 is composed of the surface sheets 13, 14 and the core material 15. First, to form the surface sheets 13, 14, the side window opening 44 is formed in a light alloy sheet acting as the blank and this light alloy sheet is cut to a width corresponding to the spacing gap of the side posts 11 to a length corresponding to the dimension from the side sill 6 to the cant rail 16. For the core 15, the honeycomb is constituted by precombining light alloy sheets of predetermined shape. For the connecting member 17 and the edge member 22, blanks are cut in a predetermined length and, as necessary, are shaped. These surface sheets 13, 14, the core 15 and the members 17, 22 are joined at continuously extending joints by interposing a metallic connecting material, that is a brazing material, at each connecting portion and heating to the brazing temperature.

The panel 12 produced in this manner may be a substantially flat panel having a predetermined thickness or in the case of the structure wherein the eave portion on the upper side of the window opening 44 and the wainscot portion on the lower side of the window opening 44 are curved in the side construction 2 of the body structure 1, the curved shape is produced after the side panel 12 is completed.

Alternatively the curved shaping of the panel 12 may be achieved by shaping the sheets 13, 14 and the core 15 to the predetermined shape after cutting of the light alloy sheet material and the light alloy honeycomb material, but before their brazing together. However, in this case, the number of components to be shaped increases and there is the problem that dimensional accuracy must be secured in each component.

The panel 12 having the desired shape is completed when the sheets 13, 14, the core 15, the connecting member 17 and the edge member 22 are connected. This assembly can be rapidly carried out.

Next, the production of the side construction 2 using the panels 12 produced in the above-mentioned manner will be explained.

A jig is formed so that its support surface for receiving the panels 12 corresponds to the outer surface of the side construction 2. The panels 12 are sequentially disposed and aligned in the longitudinal direction of the car body on the surface of this jig. The joint flanges 19b of the connecting members 17 of the adjacent panels 12 are positioned with a weldable gap. The panels 12 are clamped and the opposed joint flanges 19b of the adjacent pairs of panels 12 are connected by welding. The welding is carried out from the inner side of the car body. Then the frames, that is the side posts 11, the window head 10 and the belt rail 9, are put on the joined panels 12, and are clamped. The desired portions of the connecting members 17 and the side post 11, the edge member 22 and the window head 10 and the belt rail 9 and further the side post 11 and the window head 10 and the belt rail 9 are connected by welding. When this connection of all members is completed in this manner, the side construction is taken from the jig and the outer surface of the weld portion 20 of each connecting member 17 on the outer side of the car body is finished smooth by a grinder or the like to complete the production of the side construction 2.

If the side construction 2 is produced in the above-mentioned manner, the connecting work can be made while sequentially placing the panels 12, the side posts 11, the window heads 10 and the belt rails 9 on the jig. In other words, since the constituent members need not be moved or turned over on the jig, work efficiency is high and a reduction in the number of the production steps can be accomplished. The connecting of the panels 12, the side posts 11, the window heads 10 and the belt rails 9 are all downward welding work on the jig, that is, work is only from the inside of the side construction 2. Accordingly, reliability of the welded portion of each member is high and work efficiency can also be improved. The connecting work described above can be automated.

Connecting of the window head 10 and the belt rail 9 to the panel 12 may be made by bonding the window head 10 and the belt rail 9 to the edge member 22 of the side panel 12 when it is a single body. In this case, the work process is somewhat different. In other words, when the connection of each panel 12 is completed, the side post 11 is placed in such a manner as to bridge between the connecting members 17 of the adjacent panels 12 and it is only necessary to bond the connecting members 17 to the side posts 11 and the side posts 11 to the end surfaces of the window head 10 and the belt rail 9. In such a process, the connecting work of each member on the jig can be reduced and from this point efficiency can be improved.

The underframe 3 is produced by combining and connecting the side sills 6 and the cross beams 7 and aligning and connecting the shaped members of the floorplate 8 in the transverse direction.

The roof construction 4 is produced by combining and connecting the cant rails 16 and the carlines 23 and then aligning and connecting the shaped sheets 24 in the transverse direction.

As to the end constructions 5, after the frames are combined and connected, the outer plates are connected to produce the end construction.

The body structure 1 is produced by combining the side constructions 2, underframe 3, roof construction 4 and end constructions 5. First, the side constructions 2 are disposed vertically on both sides of the underframe 3, that is, on the upper part of the side sills 6, and the end constructions 5 are disposed on the upper surface at both end portions of the underframe 3. Then, the underframe 3 and the side constructions 2 are connected and the underframe 3 and the end constructions 5 are connected. At the same time, the side constructions and the end constructions 5 are connected. The roof construction 4 is put on the two side constructions 2 and the two end constructions 5, and the roof construction 4 and the two side constructions 2 and the roof construction 4 and the two end constructions 5 are respectively connected. In this manner the body structure 1 is assembled.

In the structure described above, the weight of the body structure 1 itself, a vertical load due to various equipment disposed on the lower surface of the underframe 3 and due to passengers and transmitted from the underframe 3 and a pressure load due to a pressure change outside the car body act on the side construction 2. Since the side construction 2 is constituted mainly by the panels 12, the side construction 2 has sufficient strength against these loads. In other words, since the panels 12 are formed by laminating the surface sheets 13, 14 and the core 15 and connecting these members, its bending stiffness and shearing stiffness are higher than those of a flat plate. Accordingly, the panel 12 resists out-of-plane deformation and can sufficiently withstand the loads described above. Particularly, it is effective for the pressure load acting on the car body due to pressure change outside the car body and it is not necessary to improve strength by disposing reinforcing materials on the panel 12. Further, connecting of the surface sheets 13, 14 and the core 15 by use of a metallic bonding material is effective for providing stiffness.

When the panel 12 is compared with a conventional shaped member of a light alloy which has substantially the same weight as the total weight of the surface sheets 13, 14 and the core 15, the panel 12 has higher bending stiffness. This means that when the weight of the structure is the same, the body structure 1 using the panels 12 has higher stiffness. If stiffness of the structure is substantially the same, the body structure 1 using the panels 12 has a smaller weight.

Since the panel 12 has higher bending stiffness and higher shearing stiffness, when it is used for the side construction 2 as described above, strain due to the vertical load and due to the residual stress with welding does not occur on the surface of the car body and appearance can be improved. Since the strain in the surface of the car body can be reduced, the strain removing work can be eliminated. Further, the panel 12 has a structure wherein the connecting member 17 is disposed around it and the panel 12 is joined to the next panel 12 or other member such as the side post 11 through this connecting member 17. Therefore, the drop of strength at the joint portion can be prevented in comparison with the case where the honeycomb member made of the light alloy itself is connected. When the shaped member made of the light alloy is used as the connecting member 17 described above, even a complicated shape can be produced highly accurately, easily and economically. Connecting the belt rail 9 and the window head 10 to the panel 12 is made through the edge member 22. Therefore, reduction of strength at each bond portion can be prevented. Furthermore, since the surface of the connecting flange 19b at the outside of the car body is flush with the surface of the surface sheet 13 outside the car body, the surface of the side construction 2 can be made smooth by grinding only the surface of the weld portion 20 outside the car body. Accordingly, smoothing by use of a putty for the surface of the side construction, as has been carried out conventionally after completion of the body structure, can be simplified.

If the side post 11 described above which is the reinforcing member is shaped integrally with the connecting member 17 described above, the number of components can be reduced and the connecting work between the connecting member and the side post can be eliminated. This permits reduction of the number of man hours at the time of production of the side construction.

Figure 5:
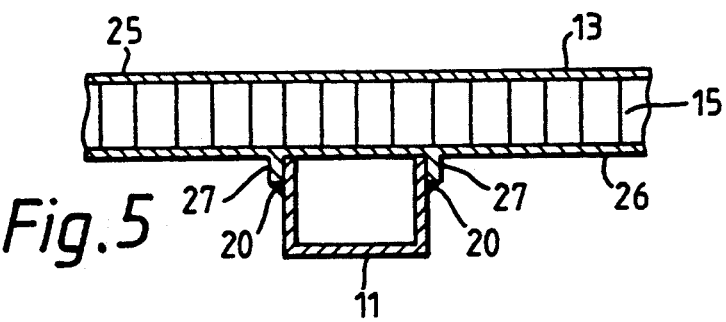
FIGS. 5 and 6 are cross sectional views of two laminate members which may be used in the present invention and their connection to frame members in a railway car body structure.

Referring to FIG. 5, there is shown a panel 25 which is a modified form of the panel of FIG. 3, being adapted for the attachment of a side part 11 at an intermediate position between the edges of the panel. Two flanges 27 for connecting with the side post 11 are formed integrally on the inner sheet on the inner side of the panel 25. This sheet 26, the outer sheet 13 and the core 5 are brazed to form the laminate panel 25. With this structure, in comparison with the case where the side post 11 is directly welded to a planar portion of the sheet 26, the side post 11 is connected to the flanges 27 through the welds 20 and therefore the strength of the connection is improved. When the side post 11 is being connected to the panel 25, the flanges 27 can be utilized as positioning means for the side post 11. Further, strain of the sheets 26, 13 resulting from adverse influence of welding heat on the brazed portion of the panel 25 can be prevented. The construction of this panel is otherwise as already described.

Figure 6:
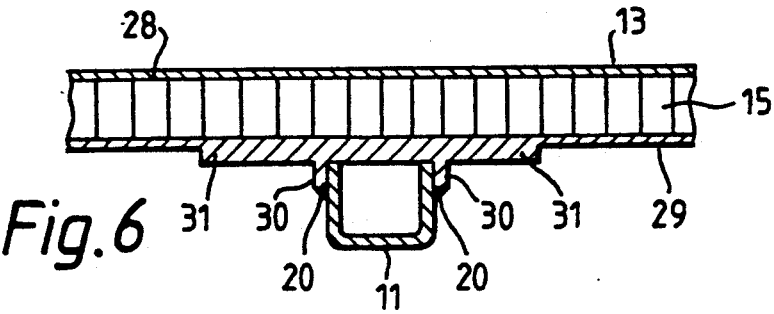

The panel 28 of FIG. 6 likewise has two flanges 30 for connection of the side post 11 formed integrally on the inner sheet 29 on the inner side of the panel 28. A region 31 of the sheet 29 where the flanges 30 are disposed has a greater thickness than the other parts of the sheet 29, i.e. than the nominal sheet thickness. The side post 11 is connected by welding to the flanges 30. In this structure, the load transmitted from the side post 11 to the panel 28 is transmitted through the flanges 30 and the thicker region 31. Since the sectional area of the region 31 is greater than the sectional area of the flanges 30, the load transmitted per unit area of the region 31 can be reduced. Due to this, improvement of strength at the connection between the panel 28 and the side post 11 can be achieved.

In the embodiment shown in FIG. 6, the flanges 30 and the thicker region 31 are shaped integrally on the sheet 29 but they may be formed separately. In that case the flanges 30 and a backing sheet for them are a shaped member formed integrally, e.g. by extrusion, and when this shaped member is connected to the sheet 29 by brazing, the same effect as that of the panel 28 described above can be exhibited. In this case, the location of connection of the side post 11 can be chosen arbitrarily.

Next, other embodiments of the connection between two adjacent panels will be explained with reference to.

Figure 7:
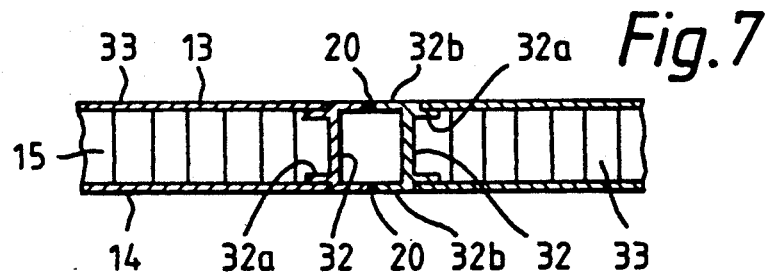
FIGS. 7 and 8 are cross sectional views of laminate members which may be used in the present invention and their joint regions at their edges.

In FIG. 7, the same reference numerals as in FIG. 3 are used for like parts. The panels 33 here have connecting members 32 whose section is substantially I-shaped, connected by continuous brazing at the edges of the panels. They have flanges 32a stepped inwardly which are connected by brazing to the sheets 13, 14 and projecting flanges 32b for welding to the other connecting member to form the panel joint. The weld locations are shown at 20.

In this structure, when the connecting members 32 are connected to one another, a sectional shape which is the same as a structural member having a box-shaped section is obtained. Accordingly, strength of the connection between the panels 33 can be improved. This results in the improvement in the strength of a structure constructed by use of the panels 33 described above.

Figure 8:
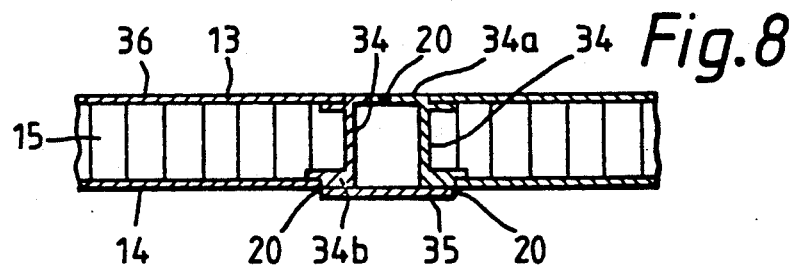

In the panels 36 of FIG. 8, the brazed-on connecting members 34 have substantially the same shape as the connecting member 17 of the embodiment shown in FIG. 3. A metal patch 35 connects the flanges 34b of the connecting members 34 on the inside face of the panel, being welded on at weld lines 20.

According to such a structure, when the panels 36 having the connecting members 34 are connected with one another, the outer welding flanges 34a of the connecting members 34 are first connected. Then, the connecting members 34 are connected through the patch 35. In this manner, the welding work involved in connecting the panels 36 can be carried out from one side only of the panels 36. This means that since all the welding work is carried out downwardly, the panels 36 need not be reversed on the jig and the process can be simplified. Incidentally, at the connection of the panels 36, a structure having a box-shaped section is formed as in the embodiment shown in FIG. 7.

Figure 9A:
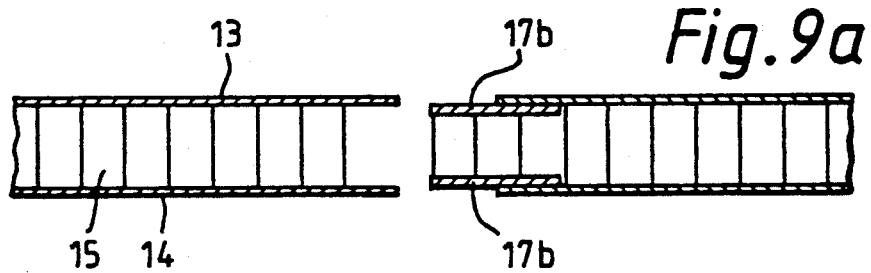
FIGS. 9a and 9b show a further pair of laminate members which may be used in the present invention respectively before and after their joining.
Figure 9B:
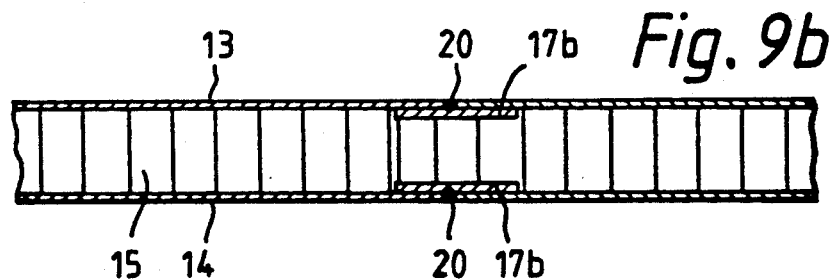

FIGS. 9 and 10 show further ways of forming laminated panels and panel assemblies embodying the invention. FIG. 9a shows two panels composed of sheets 13, 14 and core 15 as before. One panel has connecting plates 17b brazed to its sheets 13, 14 at their edge, so that parts of the plates 17b project laterally as welding flanges. The plates 17b have a thickness greater than the sheets 13, 14. In the other panel, the core 15 is recessed from the edges of the sheets 13, 14, to allow the plates 17b to enter between the sheets 13, 14 when the panels are assembled, after which welding is performed at welding lines 20.

In FIG. 10, welding flanges 17c are formed integrally as laterally projecting connecting members of the sheets 13, 14. The welding flanges 17c have a thickness greater than the nominal thickness of the sheets 13, 14. The flanges 17c have bevelled ends, to allow V-welding to join the panels.

In FIG. 11, a frieze board 37 forms an upper part of the side construction above the window openings 44 and a wainscot 38 forms a lower part below the window openings. Both the frieze panel 37 and the wainscot 38 are formed of a plurality of the panels according to the invention welded together side-by-side. The width of the panels of the frieze board 37 and the panels of the wainscot 38 in the longitudinal direction of the car body corresponds to the spacing of adjacent side posts 11 but this width can be changed if desired. The panels of the frieze board 37 and the wainscot 38 have the structure wherein two surface sheets, a core and connecting members are connected by brazing and an edge member is welded on, all as shown in FIG. 4, in the same way as in the panel 12 described above.

FIG. 11 shows that window frame members 39 are disposed between the frieze board 37 and the wainscot 38. Each window frame member 39 is a shaped member of a light alloy and one or a plurality of such shaped members are disposed in the longitudinal direction of the car body. To form the window openings 44, the corresponding portions of each member 39 are cut off. The frieze board 37 is connected to the upper window frame member 39 and the wainscot panel 38 is connected to the lower window frame member 39. This connection is carried out by connecting the edge members 22 of the frieze board 37 and the wainscot panel 38 shown in FIG. 11 to the window frame member 39 by welding. The car body structure 1a of FIG. 11 is different only in the side construction 2a from the embodiment of FIG. 1.

In the structure of FIG. 11, the window post portions 45, on which the most severe conditions from the aspect of strength are imposed in the side construction 2a, can be formed as a unitary body as the window frame members 39. Thereby, reduction of weight and improvement in strength of the side construction 2a can be accomplished. In other words, the window frame members 39 can have a specification having sufficient strength, and the frieze board 37 and the wainscot panel 38 can have a specification with sufficient strength and reduced weight. The window frame members 39 are shaped members of a light alloy and the belt rail 9 and the window head 10 can be formed integrally with these window frame members 39, reducing the number of components and the number of man-hours required for assembly of the window frame members 39.

Even when the window frame members 39 are made of structural steel or stainless steel, reduction of weight and improvement in strength of the side construction 2a can be accomplished. However, if the window frame members 39 are made of material different from that of the frieze board 37 and the wainscot panel 38, their connection needs to be made by mechanical connecting means such as rivets or by welding using a clad material.

In the embodiment of FIG. 12, the roof sheet members 40 are constituted by laminate panels of the invention formed by connecting and brazing two sheets, a core and at least one connecting member disposed on the outer periphery. A plurality of roof sheet members 40 are aligned side-by-side in the longitudinal direction of the car body between cant rails 16 disposed in parallel on both sides. The adjacent pairs of roof sheet members 40 are connected by welding and a carline 41 is connected to each joint portion to constitute the roof construction 4a. Each roof sheet member 40 extends the full width between the cant rails 16.

The production of the roof construction 4a is carried out in the following way. A jig for constituting the roof construction 4a has a support surface for receiving the roof sheet members 40 conforming to the outer surface of the roof construction 4a. First a plurality of roof sheet members 40 are put on the jig and aligned. Then, the roof sheet members 40 are connected by welding while clamped. Then the cant rails 16 and carlines 41 are put on the assembly of roof sheet members and are connected to them while clamped. The roof construction 4a assembled in this manner is taken out from the jig and outer surface of the joint of each roof sheet member 40 is finished smoothly.

The above applies when the cant rails and carlines are separate members. It is also possible to connect in advance the cant rails 16 and the carlines 41 on the roof sheet members 40 and then to align and connect the roof sheet members 40 in the transverse direction of the car body. This is described below.

The dimension of each roof sheet member 40 in the longitudinal direction of the car body is substantially the same as that of the side panel 12. The embodiment of FIG. 1 is different from the foregoing embodiments only in the structure of the roof construction 4a.

In the structure of FIG. 12, the roof construction 4a is constituted by the laminate panels of the invention. Accordingly, an improvement in strength can be accomplished and sufficient pressure-resistance strength can be secured. In other words, since the roof sheet member 40 has higher bending stiffness than a mere flat sheet, it can sufficiently withstand even a pressure load due to outdoor pressure change. Accordingly, the roof construction 4a can have better pressure-resistance strength than the conventional roof construction consisting of the shaped members of the light alloy which has substantially the same weight as the roof construction 4a.

Since the roof sheet member 40 itself has high bending stiffness, the number of carlines 41 constituting the roof construction 4a can be reduced. Due to this, the number of components constituting the roof construction 4a can be reduced. The reduction in the number of carlines 41 results in the reduction of the weight of the roof construction 4a.

In this embodiment, the side construction 2 and the roof construction 4a have a structure comprising the laminate members but the improvement in pressure resistance of the structure can be accomplished by making only the roof construction 4a of the laminate member. In other words, the roof construction has a large area and the pressure load acting with outdoor pressure change is great. On the other hand, it is difficult to dispose a large number of frames in the roof construction in order to secure a wide space for the passengers or from the aspect of the reduction of the overall weight. Accordingly, the use of the laminate members for the roof construction as described above means that since the strength of the laminate member is high, the pressure load described above can be supported by a smaller number of frames. This results in the improvement of pressure resistance of the roof construction itself and the body structure as a whole.

Next, the structure of the connection between the roof sheet member 40 and cant rails 16 and the carlines 41 in the roof construction described above will be explained with reference to FIGS. 12a, 13, 14 and 15.

FIG. 12a shows that the cant rail 16 is formed of two connecting members 16a, 16b attached by brazing respectively to the adjacent panels 40 and 12 of the roof and side constructions. The connecting members have small flanges brazed to the inside faces of the surface outer sheets of the panels 12, 40 and projecting flanges which are thicker than the surface sheets of the panels and are welded together at weld lines 20. At the outside of the car body a butt weld is used, and at the inside an overlap weld with one flange acting as a backing member. In this manner a box structure of the cant rail 16 is provided. The side posts 11 and carlines 41 are welded to the side faces of the cant rail 16.

At this point the connection of the lower end of the side panel 12 to the side sill shown in FIG. 12b is desired. The lower edge of the panel 12 has a large connecting member 51 which is brazed to the surface sheets of the panel 12 and has two projecting flanges welded to the top of the sill 6 at weld 20. The side post 11 is welded to the side of the connecting member 51.

FIG. 13 shows the connection between two adjacent roof sheet members 40 and the carline 41 in the roof construction 4a shown in FIG. 12. A connecting member 17a is brazed at the periphery of the roof sheet member 40. The connecting member 17a has a substantially Z-shape in the same way as the connecting member 17 of the side panel 12 and is stepped to receive the surface sheets of the panel 40. The laterally projecting flanges of the adjacent connecting members 17a are bonded by the weld 20. The carline 41 which is disposed so as to bridge between the connecting members 17a of the panels 40 is connected to the inner flanges of the connecting members 17a by welds 20a.

With this roof construction, the connecting work of the adjacent roof sheet members 40 can be made from one side, that is, from the inside. Therefore, the connecting of a plurality of the roof sheet members 40 and carlines 41 can be made on the same jig. Therefore, the roof construction 4a can reduce work during production in the same way as in the side construction 2 described already. In the roof construction 4a, since the connecting members 17a can be connected mutually by welding and the connecting member 17a and the carlines 41 can be connected by downward welding, reliability of strength of each joint can be improved.

Next, FIG. 14 shows the structure wherein a carline 41a is connected to the inner sheet of the roof sheet member 40a at a location intermediate the joints between the roof sheets. Flanges 27a are formed integrally with the inner sheet of the roof sheet member 40a on the inner side. The carline 41a is shaped to be capable of being fitted between the flanges 27a and has a substantially Z-shaped sectional shape. The flanges 27a and the carline 41 are connected by the welds 20b.

With this structure, positioning of the carline 41a on the roof sheet member 40a can be facilitated. Further, since the flange 27a has a predetermined height and is connected at its tip portion to the carline 41a, the thermal influences due to welding on the sheets and the core of the panel 40a can be minimized. Further, since the thermal influence of welding on the outer sheet of the panel 40a can be prevented, the occurrence of staining of the outer sheet can be prevented.

The flanges 27a are formed integrally with the inner sheet but the flanges may be formed as separate members and may be connected to the sheet by brazing. It is also possible to employ the structure wherein the flange is formed as a flat plate separate from the surface member and to connect this flat plate to the surface member by brazing.

Next, FIG. 15 shows a structure wherein the carline is formed integrally with the connecting member of one roof sheet member 40c. The connecting member 17a of the other of the roof sheet members 40b at the joint is shaped substantially in a Z-shape in the same way as is shown in FIG. 13. The carline 41b is formed integrally with the connecting member of the other roof sheet member 40c. This integral member is composed of a shaped member of a light alloy in the same way as the connecting member 17a described above and is connected by brazing to the surface sheets and core when the roof sheet member 40c is produced.

In this structure, since the carline 41b also functions as the connecting member, the number of components can be reduced and the connecting work between the connecting member and the carline need not be carried out.

In the embodiment of FIGS. 16 and 17, an end construction 5a consists of end posts 46, corner posts 47, end plates 48, cross beams 49 and end sheet members 50. The end sheet members 50 are each made by connecting two surface members, a core material and at least one connecting member by brazing, in accordance with the invention.

The production of the end construction 5a is by positioning a plurality of end sheet members 50 formed in conformity with the shape of the end construction 5a on a jig and connecting them while clamped. Next, the end posts 46, the corner post 47, the end plates 48 and the cross beams 49 are put on the plurality of end sheet members 50 thus connected, and are connected while clamped. Each connection described above is by welding.

The car body structure is completed by connecting the end constructions 5a thus constituted to the underframe 3, the two side constructions 2 and the end portion of the roof construction 4a.

In such a structure, the end construction 5a is constituted by the end sheet members 50 each of which is a laminate panel of the invention. Therefore, pressure resistance can be improved in the same way as in the side construction 2 or the roof construction 4a of the foregoing embodiments. The body structure 1b constructed to include the end construction 5a described above can improve pressure resistance because the two side constructions 2, the roof construction 4a and the two end constructions 5a each include the laminate panels of the invention. In other words, pressure resistance of the body structure except for the underframe portion which already has sufficient strength and which can sufficiently bear the pressure load, can be improved.

In the embodiment of FIGS. 18 and 18a, the floorplate 42 includes an assembly of the laminate panels of the invention formed by connecting two sheets, a core and connecting members disposed on the outer periphery by brazing. A plurality of the panels are aligned side by side and connected together by welding at joints (not shown) extending transversely of the car body, and are then connected by welding to the upper surface of the cross beam 43 and to the side surface 6a of the side sill 6. In this manner the underframe 3a is constituted. In this structure, the cross beams 43 are disposed in such a manner as to bridge between the connecting members of the adjacent panels of the floorplate 42.

The floorplate 42 has a downwardly convex arcuate shape in transverse section of the car body in order to resist an outdoor pressure change as tensile or compressive stress, permitting reduction of the thickness of the sheets or the core of the panels and reducing weight. The radius of curvature of the arcuate section of the floorplate 42 may be increased progressively towards both sides in the transverse direction.

FIG. 18a shows the connection of one floor panel of the floorplate 42 to the sill 6. The panel has a connecting member 52 secured to its inner and outer sheets by brazing, and having projections welded at 20 to flanges of the sill 6.

This embodiment is different from the body structure shown in FIG. 16 only in the floorplate 42 of the underframe portion.

In this structure, since the floorplate 42 has sufficient bending stiffness, the number of the cross beams 43 can be reduced by expanding their spacing. Alternatively, since the floor board 42 has sufficient bending stiffness, the cross beam itself can be made lighter in weight. These measures result in weight reduction of the underframe and of the body structure as a whole.

In the body structure 1c of this embodiment, since hermetic walls encompass the passenger space i.e. the sides 12, the roof 40, the floorplate 42 and the ends 50 consisting of the laminate panels of the invention sufficient pressure resistance and strength can be obtained and at the same time, weight reduction can be accomplished.

What is claimed is:

1. A method of making a passenger car body structure having two opposite sides, a roof, two ends and a floorplate, including forming a structural panel assembly which is at least part of one of said sides, roof, ends and floorplate by steps comprising:

(i) aligning edge-to-edge at least two panels each comprising inner and outer metal sheets and, a cellular metal core brazed to said inner and outer metal sheets and maintaining said sheets spaced apart, wherein said core has a honeycomb structure having parallel cells whose axial direction is perpendicular to said inner and outer sheets, wherein at least one said panel has at an edge thereof a connecting member having a first portion substantially perpendicular to one of said inner and outer sheets and joined to said core, and having a second portion adjacent to and substantially parallel to said one of said inner and outer sheets, wherein said second portion extends away from said core to provide an end portion for welding said panel to an adjacent panel such that the weld is separated from the brazing of said core to said one of said inner and outer sheets, (ii) welding said end portion of said second portion on said at least one panel to the other of said panels to join the panels together into said panel assembly.

2. A method according to claim 1 wherein, in the joining of said panels, welding is performed first at the level of said outer sheets of said panels and thereafter at the level of said inner sheets.

3. A method according to claim 1 wherein in the joining of said panels, welding is performed only from the side of said panels which is to be at the interior of the passenger car body structure.

4. A method according to claim 1 wherein the joining of said panels is performed on a jig, and after their joining, at least one frame member is welded to the panel assembly on the same jig.

5. A method according to claim 1, wherein said connecting member is formed of a material thicker than the general sheet thickness of said inner and outer sheets.

6. A method according to claim 1, wherein said first portion of said connecting member is joined to said core by brazing, and wherein said weld and said end portion of said second portion of said connecting member will be separated from the brazing of said core to said first portion of said connecting member.

7. A method according to claim 1, wherein said connecting member further comprises a third portion located adjacent and substantially parallel to the other of said inner and outer sheets, wherein said third portion extends away from said core to provide a second end portion for welding to said adjacent panel, such that the weld between the second end portion and said adjacent panel will be separated from the brazing of said core to said other of said inner and outer sheets, wherein the method includes the step of welding said second end portion of said third portion of said connecting member on said at least one panel to the other of said panels to join panels together into said panel assembly.

* * * * *